United States Patent
Karlsson et al.

(10) Patent No.: US 12,524,229 B2
(45) Date of Patent: *Jan. 13, 2026

(54) SYSTEMS AND METHODS FOR RISK AWARENESS USING MACHINE LEARNING TECHNIQUES

(71) Applicant: Fidelity Information Services, LLC, Jacksonville, FL (US)

(72) Inventors: Per Karlsson, Saint Johns, FL (US); Benjamin Wellmann, Boca Raton, FL (US); Sheel Saket, Wheeling, IL (US); Vida Lashkari, Atlanta, GA (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,675

(22) Filed: Oct. 10, 2023

(65) Prior Publication Data

US 2024/0045671 A1 Feb. 8, 2024

Related U.S. Application Data

(63) Continuation of application No. 17/448,561, filed on Sep. 23, 2021, now Pat. No. 11,816,476.

(51) Int. Cl.
*G06F 8/71* (2018.01)
*G06F 11/32* (2006.01)
*G06N 20/00* (2019.01)

(52) U.S. Cl.
CPC .............. *G06F 8/71* (2013.01); *G06F 11/327* (2013.01); *G06N 20/00* (2019.01)

(58) Field of Classification Search
CPC .......... G06F 8/71; G06F 11/327; G06N 20/00
See application file for complete search history.

(56) References Cited

U.S. PATENT DOCUMENTS 9,176,729 B2 * 11/2015 Mockus .................... G06F 8/70
9,268,665 B2 * 2/2016 Barrow .................... G06F 8/77
(Continued)

OTHER PUBLICATIONS

Chief Information Officer: "DoD Enterprise DevSecOps Reference Design Department of Defense (DoD) Chief Information Officer", Aug. 12, 2019 (Aug. 12, 2019), pp. 1-89, XP055887783, Retrieved from the Internet: URL: https://dodcio.defense.gov/Portals/0/Documents/DoD%20Enterprise%20DevSecOps%20Reference%20Design%20v1.0_Public%20Release.pdf [retrieved on Feb. 4, 2022].
(Continued)

*Primary Examiner* — Douglas M Slachta
(74) *Attorney, Agent, or Firm* — Bookoff McAndrews, PLLC

(57) ABSTRACT

A method for training and using a machine-learning based model to reduce and troubleshoot incidents in a system may include receiving first metadata regarding a previous modification, extracting a first feature from the received first metadata, receiving second metadata regarding a previous incident, extracting a second feature from the received second metadata, training the machine-learning based model to learn an association between the previous modification and the previous incident, based on the extracted first feature and the extracted second feature, and using the machine-learning based model to determine a risk level for a proposed modification to a system.

20 Claims, 4 Drawing Sheets

(56) References Cited

U.S. PATENT DOCUMENTS

| | | | |
|---|---|---|---|
| 9,921,948 B2* | 3/2018 | Zieder | G06N 20/00 |
| 10,157,052 B2* | 12/2018 | Eberlein | G06F 8/70 |
| 10,482,000 B2* | 11/2019 | Vikjord | G06N 7/01 |
| 10,547,507 B2* | 1/2020 | Guven | G06N 5/04 |
| 10,866,848 B2 | 12/2020 | Bridges et al. | |
| 11,151,499 B2* | 10/2021 | Guven | G06Q 10/0635 |
| 11,221,908 B1* | 1/2022 | Batta | G06F 11/3072 |
| 11,360,959 B2* | 6/2022 | Pourmohammad | G06N 20/00 |
| 11,710,570 B2* | 7/2023 | Brook | G16H 20/00 705/2 |
| 11,809,859 B2* | 11/2023 | Espinha | G06N 20/00 |
| 11,816,476 B2* | 11/2023 | Karlsson | G06F 11/3604 |
| 2014/0053135 A1* | 2/2014 | Bird | G06F 8/71 717/124 |
| 2015/0100940 A1* | 4/2015 | Mockus | G06F 8/70 717/101 |
| 2016/0239402 A1* | 8/2016 | Zieder | G06F 8/20 |
| 2018/0275970 A1 | 9/2018 | Woulfe et al. | |
| 2018/0276105 A1* | 9/2018 | Srinivasan | G06N 20/00 |
| 2018/0293158 A1* | 10/2018 | Baughman | G06F 11/3692 |
| 2018/0314517 A1* | 11/2018 | Iwanir | G06F 21/563 |
| 2018/0373578 A1* | 12/2018 | Bridges | G06F 11/3604 |
| 2019/0079850 A1 | 3/2019 | Zhang et al. | |
| 2019/0138512 A1* | 5/2019 | Pourmohammad | G06Q 10/0635 |
| 2019/0227787 A1 | 7/2019 | Kumar et al. | |
| 2019/0287029 A1* | 9/2019 | Sobran | G06F 8/71 |
| 2020/0349133 A1 | 11/2020 | Dwarampudi et al. | |
| 2020/0382365 A1 | 12/2020 | Verma | |
| 2021/0141718 A1* | 5/2021 | Sandhu | G06F 8/60 |
| 2021/0157577 A1* | 5/2021 | Sobran | G06F 11/302 |
| 2021/0342207 A1* | 11/2021 | Oliveri | G06F 21/552 |
| 2022/0156134 A1 | 5/2022 | Lehmann et al. | |
| 2022/0308862 A1 | 9/2022 | Espinha et al. | |

OTHER PUBLICATIONS

International Search Report issued in International Application No. PCT/US2022/076718 dated Dec. 22, 2022 (15 pages).

* cited by examiner

SYSTEMS AND METHODS FOR RISK AWARENESS USING MACHINE LEARNING TECHNIQUES

CROSS-REFERENCE TO RELATED APPLICATION(S)

This patent application is a continuation of and claims the benefit of priority to U.S. application Ser. No. 17/448,561, filed on Sep. 23, 2021, the entirety of which is incorporated herein by reference.

TECHNICAL FIELD

Various embodiments of the present disclosure relate generally to training and using a machine-learning based model to reduce and troubleshoot incidents in a system and, more particularly, to training and using a machine-learning based model to determine a risk level for a proposed modification to a system.

BACKGROUND

Deploying, refactoring, or releasing software code has different kinds of associated risk depending on what code is being changed. Not having a clear view of how vulnerable or risky a certain code deployment may be increases the risk of system outages. Deploying code always includes risks for a company, and platform modernization is a continuous process. A technology shift is a big event for any product, and entails a large risk and opportunity for a software company. When performing such operations, there is a great need to ensure that code is refactored in the most vulnerable areas and that a correct test framework is in place before starting a transition to newly deployed code.

Additionally, software companies have been struggling to apply rules for what changes are allowed in certain releases to avoid outages, and this process is rules based and/or manually subjective. Outages and/or incidents cost companies money in service-level agreement payouts, but more importantly, wastes time for personnel via rework, and may risk adversely affecting a company's reputation with its customers. Highest costs are attributed to bugs reaching production, including a ripple effect and a direct cost on all downstream teams. Also, after a modification has been deployed, an incident team may waste time determining what caused a change in performance of a system.

The present disclosure is directed to overcoming one or more of these above-referenced challenges.

SUMMARY OF THE DISCLOSURE

According to certain aspects of the disclosure, systems and methods are disclosed for training and using a machine-learning based model to reduce and troubleshoot incidents in a system and, more particularly, to training and using a machine-learning based model to determine a risk level for a proposed modification to a system.

An embodiment of the disclosure may be a method for training a machine-learning based model, the method comprising, performing by one or more processors, operations including: receiving first metadata regarding a previous modification to a system; extracting a first feature from the received first metadata; receiving second metadata regarding a previous incident related to the previous modification occurring in the system; extracting a second feature from the received second metadata; training the machine-learning based model to learn an association between the previous modification and the previous incident related to the previous modification, based on the extracted first feature and the extracted second feature; and automatically determining a risk level for the previous modification based on the extracted first feature, by using the trained machine-learning based model, based on the learned association between the previous modification and the previous incident related to the previous modification.

An embodiment of the disclosure may be a method for determining a risk level for a proposed modification to a system, the method comprising, performing by one or more processors, operations including: receiving metadata regarding the proposed modification to the system; extracting a feature from the received metadata, the extracted feature corresponding to a feature of a trained machine-learning based model for determining the risk level for the proposed modification based on a learned association between the extracted feature and an incident occurring in the system; and automatically determining the risk level for the proposed modification based on the extracted feature, by using the trained machine-learning based model that was trained based on a first feature extracted from metadata regarding a previous modification to the system and a second feature extracted from metadata regarding a previous incident related to the previous modification occurring in the system, based on the learned association between the extracted feature and the incident occurring in the system.

An embodiment of the disclosure may be a computer-implemented system for determining a risk level for a proposed modification to a system, the system comprising: a memory to store instructions; and a processor to execute the stored instructions to perform operations including: receiving metadata regarding the proposed modification to the system; extracting a feature from the received metadata, the extracted feature corresponding to a feature of a trained machine-learning based model for determining the risk level for the proposed modification based on a learned association between the extracted feature and an incident occurring in the system; and automatically determining the risk level for the proposed modification based on the extracted feature, by using the trained machine-learning based model that was trained based on a first feature extracted from metadata regarding a previous modification to the system and a second feature extracted from metadata regarding a previous incident related to the previous modification occurring in the system, based on the learned association between the extracted feature and the incident occurring in the system.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

As will be apparent from the embodiments below, an advantage to the disclosed systems and methods is that the disclosed systems and methods provide an end-to-end approach to incidents, as compared to current isolated improvements per department, which will lead to increased communication and focus on common problems. The disclosed systems and methods provides a solution for all departments in a company to supply data to be commonly available for insights to all departments. As a result, a team may take actions such as extra testing, extra staff during hardware and/or software deployment, and provide directions for refactoring code, for example.

For example, the disclosed systems and methods may provide intelligent alerts along the DevOps loop to mitigate incidents, reduce development bugs, and identify risks proactively in real-time. The disclosed systems and methods may be integrated with code repositories to alert developers when critical code segments are modified or provide auto-approve for less critical code segments, which will reduce long-term development maintenance. The disclosed systems and methods may be integrated with deployment and configuration management platforms to alert operations and service delivery personnel when configuration items are modified or auto-approve non-critical changes. The disclosed systems and methods may be used in test-automation, which may reduce time to release. The disclosed systems and methods may be used with incident management to alert incident handlers about potentially code-related or change-related incidents and provide valuable information to improve speed of resolution.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The present disclosure relates to methods and systems for training and using a machine-learning based model to reduce and troubleshoot incidents in a system and, more particularly, to training and using a machine-learning based model to determine a risk level for a proposed modification to a system.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
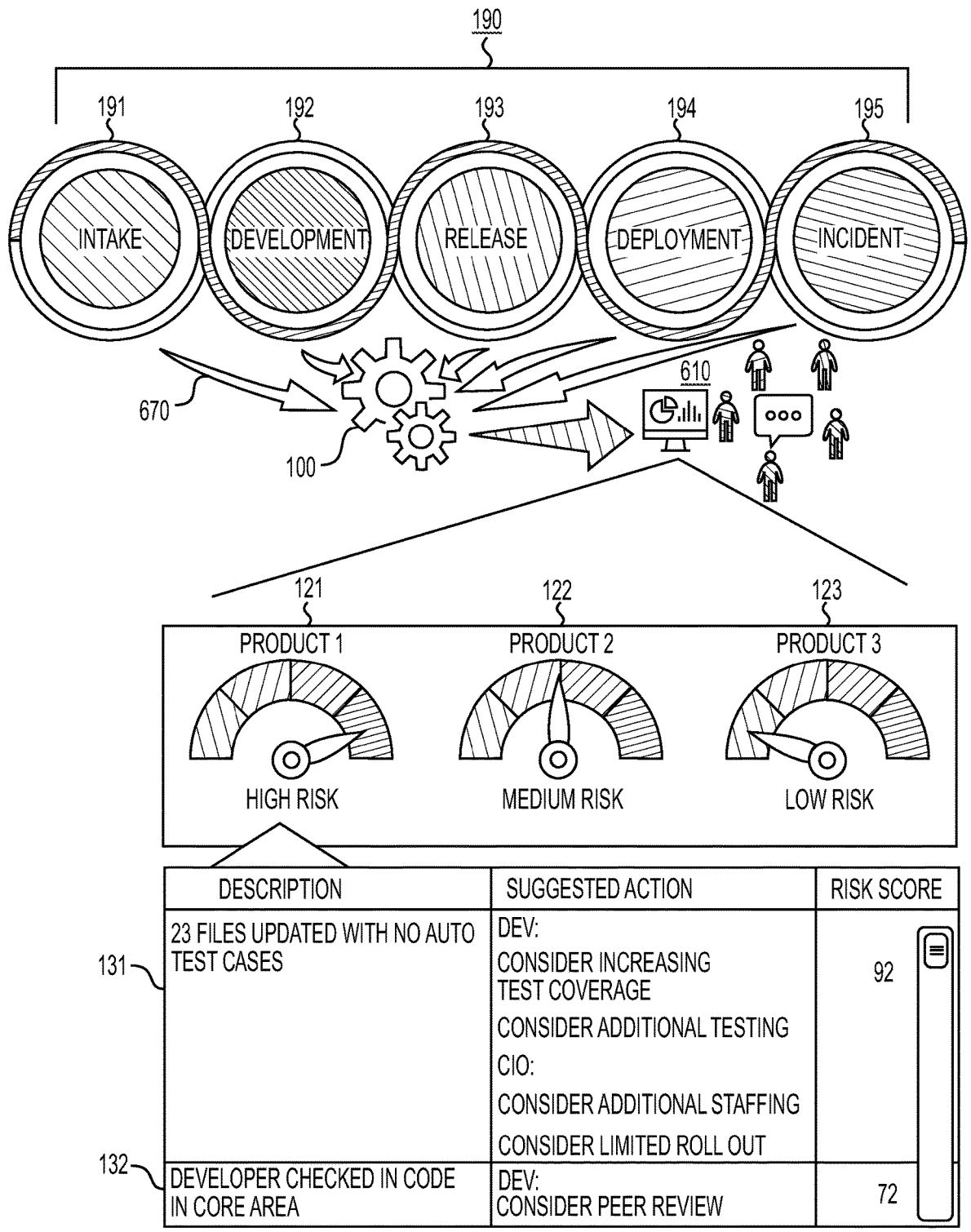
FIG. 1 depicts an exemplary system overview for risk aware software development and information technology operations (DevOps) using machine learning techniques, according to one or more embodiments.

FIG. 1 depicts an exemplary system overview for risk aware software development and information technology operations (DevOps) using machine learning techniques, according to one or more embodiments.

As shown in FIG. 1, a Risk Aware System 100 may receive information over network 670 from DevOps System 190. DevOps System 190 may include at least one of an intake system 191, a development system 192, a release system 193, a deployment system 194, or an incident reporting system 195. The Risk Aware System 100 may use machine learning techniques to analyze the received information and display information on display 610.

As an example, when a potential code segment upgrade is submitted into a system for approval, an API may be triggered to send metadata associated with the code segment to the AI engine residing in the cloud, which analyzes the metadata using a trained model, and may provide an alert and/or risk rating to a UI.

Here, the API may be exposed in a Cloud Environment Service and integrated/called from the DevOps system or code repository when new code would be checked in to the repository. Generally, code may be centrally organized in a managed/protected code repository. Metadata may be part of the "code commit". A file is changed by a developer and then committed and pushed into the central repository. The code repository tracks metadata of the commit such as user-name, file change, exact code modified/added/removed, dependencies of the code, timestamp, and reason for code change, for example. Metadata may be different across code repository platforms, but generally consists of the same core fields. The system includes the code repository (database) and also an "analytics database" that would be leveraged for visualization/UI display. In a real-time solution, each code update would trigger either an update to that analytics database directly or have a daily/weekly batch up.

One of the machine learning techniques that may be useful and effective for the analysis is a neural network, which is a type of supervised machine learning. Nonetheless, it should be noted that other machine learning techniques and frameworks may be used to perform the methods contemplated by the present disclosure. For example, the systems and methods may be realized using other types of supervised machine learning such as regression problems, random forest, etc., using unsupervised machine learning such as cluster algorithms, principal component analysis (PCA), etc., and/or using reinforcement learning.

The displayed information may include a determined risk level 121 for a first product in DevOps System 190, a determined risk level 122 for a second product in DevOps System 190, and a determined risk level 123 for a third product in DevOps System 190. The displayed information may also include specific alerts, e.g., an alert 131 and alert 132. Alert 131 may provide a first alert identifying, for example, a first proposed modification to DevOps System 190, may provide a first suggested action for reducing, for example, the determined risk level for the first proposed modification to the DevOps System 190, and may provide the determined risk level as a first score from 0 to 100. Alert 132 may provide a second alert identifying, for example, a second proposed modification to DevOps System 190, may provide a second suggested action for reducing, for example, the determined risk level for the second proposed modification to the DevOps System 190, and may provide the determined risk level as a second score from 0 to 100. The first and second proposed modifications may include at least one of a modification of a hardware component or a software component of DevOps System 190.

Figure 2:
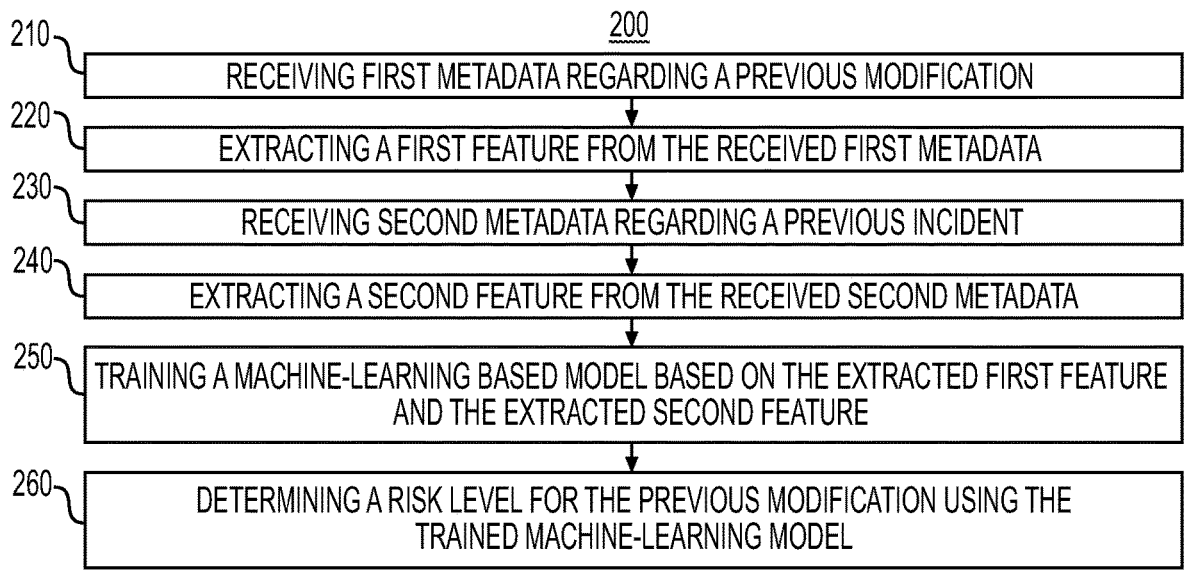
FIG. 2 depicts a flowchart of a method of training a machine-learning based model, according to one or more embodiments.

FIG. 2 depicts a flowchart of a method 200 for training a machine-learning based model, according to one or more embodiments.

As shown in FIG. 2, in operation 210, the Risk Aware System 100 may receive first metadata regarding a previous modification to DevOps System 190, and in operation 220, may extract a first feature from the received first metadata. In operation 230, the Risk Aware System 100 may receive second metadata regarding a previous incident related to the previous modification occurring in the DevOps System 190, and in operation 240, may extract a second feature from the received second metadata.

As an example, the first and second metadata may be provided from a database including first incident reports with information for each incident provided with an incident number, closed date/time, category, close code, close note, long description, short description, root cause, and assignment group. As an example, the first and second metadata may be provided from a database including second incident reports with information for each incident provided with an issue key, description, summary, label, issue type, fix version, environment, author, and comments. As an example, the first and second metadata may be provided from a database including third incident reports with information for each incident provided with a file name, script name, script type, script description, display identifier, message, committer type, committer link, properties, file changes, and branch information. These are merely examples of information that may be used as metadata, and the disclosure is not limited to these examples.

In operation 250, the Risk Aware System 100 may train the machine-learning based model to learn an association between the previous modification and the previous incident related to the previous modification, based on the extracted first feature and the extracted second feature. In operation 260, the Risk Aware System 100 may automatically determine a risk level for the previous modification based on the extracted first feature, by using the trained machine-learning based model, based on the learned association between the previous modification and the previous incident related to the previous modification.

Here, topic modeling, such as Latent Dirichlet Allocation or Neural Topic Modeling, and clustering, such as Bidirectional Encoder Representations from Transformers or Hierarchical Density-Based Spatial Clustering of Applications with Noise, for example, may be performed using metadata from a variety of sources to create clusters. Unsupervised learning may be done for incident descriptions, resolution notes, issue tracking tickets, and code repository commit messages, for example. Auto-labeling of the created clusters may be performed using topic modeling. The finalized clusters may be used as classes to train a supervised classifier model. Because the amount of data may be massive, various Deep Learning models such as Artificial Neural Network, Recurrent Neural Networks, and Long-Short Term Memory may be used. Using the final classification tags from the supervised model, an incident journey may be mapped. These are merely examples of a machine-learning based model, and the disclosure is not limited to these examples.

Figure 3:
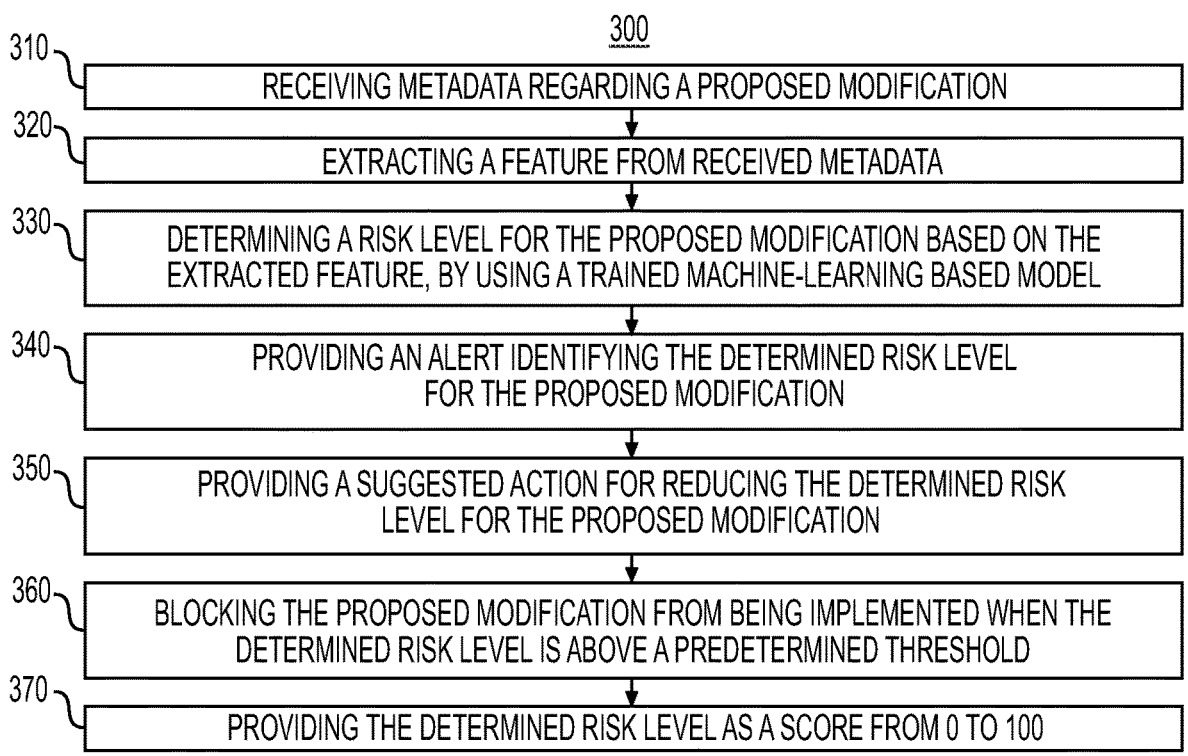
FIG. 3 depicts a flowchart of a method for determining a risk level for a proposed modification to a system, according to one or more embodiments.

FIG. 3 depicts a flowchart of a method 300 for determining a risk level for a proposed modification to a DevOps System 190, according to one or more embodiments.

As shown in FIG. 3, in operation 310, the Risk Aware System 100 may receive metadata regarding the proposed modification to the DevOps System 190, and in operation 320, may extract a feature from the received metadata, the extracted feature corresponding to a feature of a trained machine-learning based model for determining the risk level for the proposed modification based on a learned association between the extracted feature and an incident occurring in the DevOps System 190. In operation 330, the Risk Aware System 100 may automatically determine the risk level for the proposed modification based on the extracted feature, by using the trained machine-learning based model that was trained based on a first feature extracted from metadata regarding a previous modification to the DevOps System 190 and a second feature extracted from metadata regarding a previous incident related to the previous modification occurring in the DevOps System 190, based on the learned association between the extracted feature and the incident occurring in the DevOps System 190.

The risk level may be determined using dynamic thresholds (not fixed thresholds) that can vary by application/platform/code repository and change over time and/or by use of a multi-class (e.g. 3-class) classification model (machine-learning/statistical model based) approach that would have more flexibility than a traditional single value/dimension approach.

In operation 340, the Risk Aware System 100 may provide an alert identifying the determined risk level for the proposed modification to the DevOps System 190. In operation 350, the Risk Aware System 100 may provide a suggested action for reducing the determined risk level for the proposed modification to the DevOps System 190. In operation 360, the Risk Aware System 100 may block the proposed modification from being implemented when the determined risk level is above a predetermined threshold. In operation 370, the Risk Aware System 100 may provide the determined risk level as a score from 0 to 100.

Risk Aware System 100 may provide a risk identification model that will predict the degree of risk for every code change/commit. This may be accomplished by using the incident journey, so that the system may reverse engineer and identify the patterns in incoming incidents due to code changes, by training a risk classification model that will tag the code changes to a risk degree, and by using a threshold analysis for setting the risk degrees such as 1.5 Interquartile Range/3 Interquartile Range and Receiver Operating Characteristic curve analysis. The thresholds may be dynamic and specific for a particular Assignment Group. The model may identify risks proactively in real-time as incident, issue ticket, and script data are collected.

Risk Aware System 100 may provide a model that can proactively suggest code changes/resolutions for incoming incidents, by building a classification/probability prediction (for example, Multi-Layer Perceptron, Logistic Regression, or Artificial Neural Network) model to identify whether a new incident is code change related or not. If a new incident is code change related, the incident journey may be used to identify which part of the code that needs to be changed to fix the issue. In the code, the incident journey may identify which branch, file, or class or module should be changed.

Figure 4:
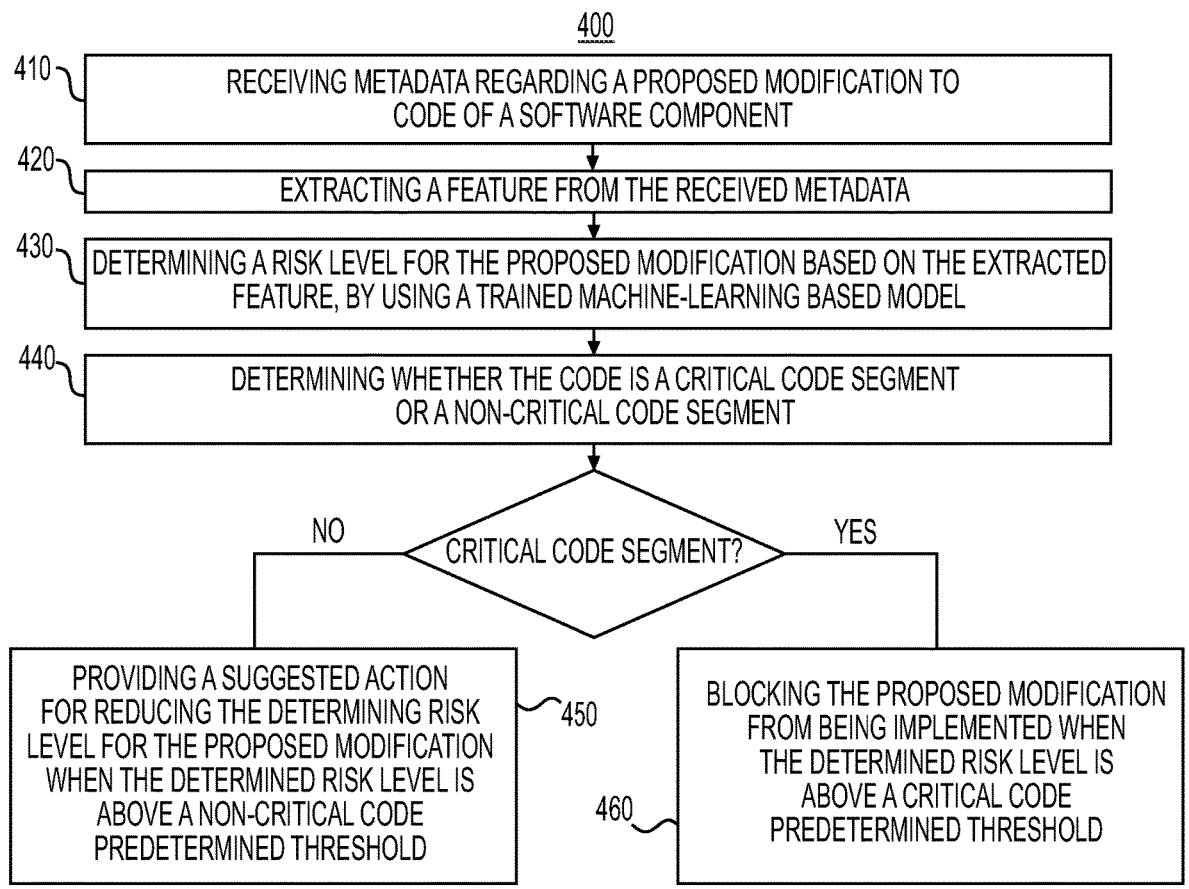
FIG. 4 depicts a flowchart of a method for determining a risk level for a proposed modification to code of a software component of a system, according to one or more embodiments.

FIG. 4 depicts a flowchart of a method 400 for determining a risk level for a proposed modification to code of a software component of a DevOps System 190, according to one or more embodiments.

As shown in FIG. 4, in operation 410, the Risk Aware System 100 may receive metadata regarding the proposed modification to code of the software component of the DevOps System 190, and in operation 420, may extract a feature from the received metadata, the extracted feature corresponding to a feature of a trained machine-learning based model for determining the risk level for the proposed modification based on a learned association between the extracted feature and an incident occurring in the DevOps System 190. In operation 430, the Risk Aware System 100 may automatically determine the risk level for the proposed modification based on the extracted feature, by using the trained machine-learning based model that was trained based on a first feature extracted from metadata regarding a previous modification to the DevOps System 190 and a second feature extracted from metadata regarding a previous incident related to the previous modification occurring in the DevOps System 190, based on the learned association between the extracted feature and the incident occurring in the DevOps System 190.

In operation 440, the Risk Aware System 100 may determine whether the code is a critical code segment or a non-critical code segment. In operation 450, the Risk Aware System 100 may provide a suggested action for reducing the determined risk level for the proposed modification when the code is determined to be a non-critical code segment and the determined risk level is above a non-critical code predetermined threshold. In operation 460, the Risk Aware System 100 may block the proposed modification from being implemented when the code is determined to be a critical code segment and the determined risk level is above a critical code predetermined threshold.

Figure 5:
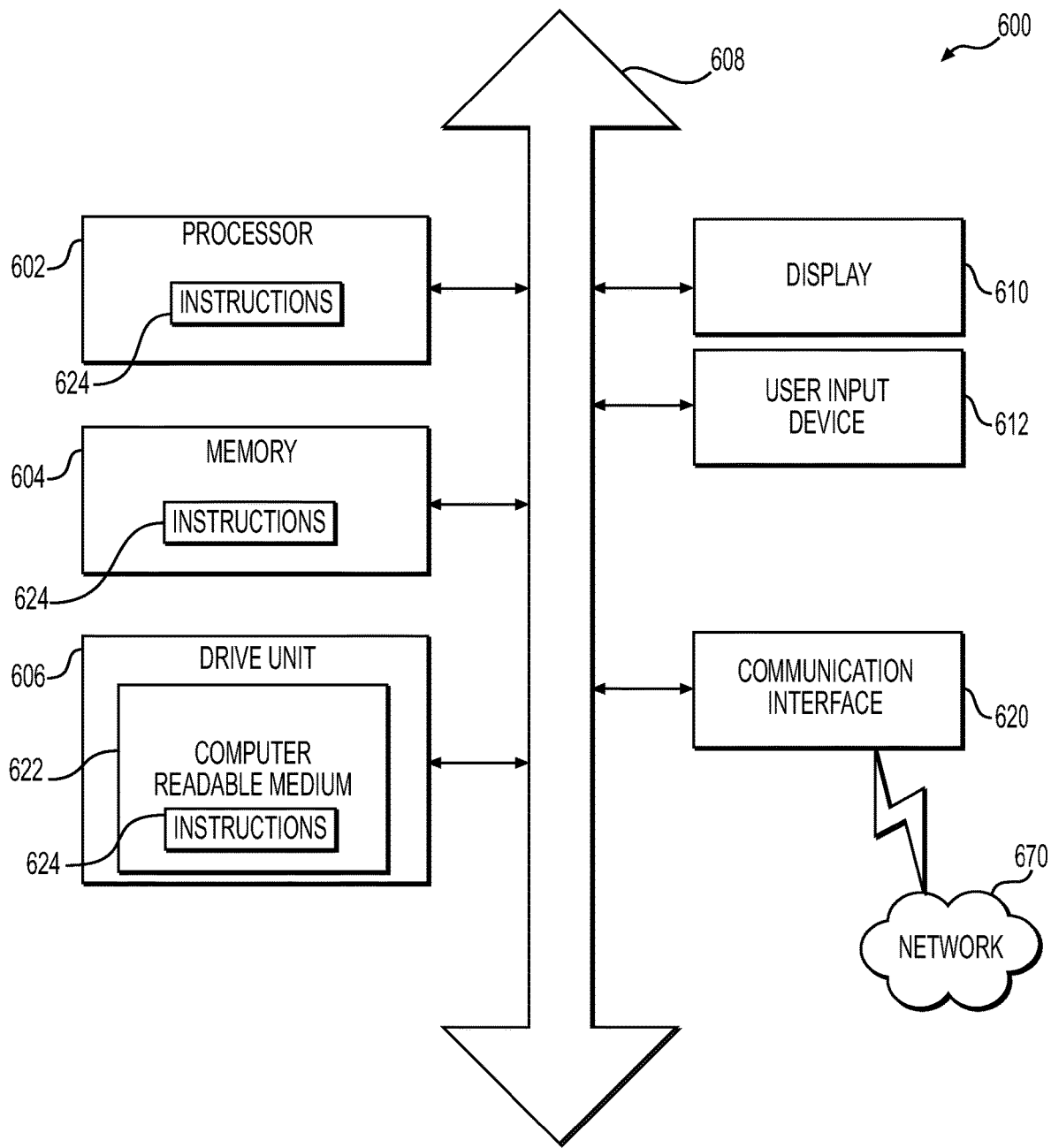
FIG. 5 illustrates an implementation of a general computer system that may execute techniques presented herein.

FIG. 5 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 5 illustrates an implementation of a computer system 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 5, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of computer system 600. The input device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 670, external media, the display 610, or any other components in computer system 600, or combinations thereof. The connection with the network 670 may be a physical connection, such as a wired Ethernet connection or may be established wirelessly as discussed below. Likewise, the additional connections with other components of the computer system 600 may be physical connections or may be established wirelessly. The network 670 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as falling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method comprising, performing by one or more processors, operations including:
    determining a risk level for a proposed modification to code of a software component of a system, the determining a risk level for the proposed modification including:
        receiving metadata regarding the proposed modification to the system;
        extracting a feature from the received metadata, the extracted feature corresponding to a feature of a trained machine-learning based model for determining the risk level for the proposed modification based on a learned association between the extracted feature and an incident occurring in the system; and
        automatically determining the risk level for the proposed modification based on the extracted feature, by using the trained machine-learning based model, wherein the trained machine-learning based model is a multi-class classification machine learning model, wherein the automatically determining the risk level for the proposed modification comprises implementing dynamic thresholds that vary by application or code repository;
determining whether the proposed modification to code of the software component of the system is to a critical code segment or a non-critical code segment, and
performing one or more of:
    performing a first action when the proposed modification to the code is determined to be to a non-critical code segment and the determined risk level is above a non-critical code predetermined threshold, or
    performing a second action when the proposed modification to the code is determined to be to a critical code segment and the determined risk level is above a critical code predetermined threshold.

2. The method of claim 1, wherein:
the first action includes providing a suggested action for reducing a risk level for the proposed modification, and
the second action includes blocking the proposed modification from being implemented.

3. The method of claim 1, wherein the operations further include:
providing an alert identifying the determined risk level for the proposed modification to the system.

4. The method of claim 1, wherein the trained machine-learning based model was trained based on a first feature extracted from metadata regarding a previous modification to the system and a second feature extracted from metadata regarding a previous incident related to the previous modification occurring in the system, based on the learned association between the extracted feature and the incident occurring in the system.

5. The method of claim 1, wherein the operations further include:
providing the determined risk level as a score from 0 to 100.

6. The method of claim 1, wherein the system includes at least one of an intake system, a development system, a release system, a deployment system, or an incident reporting system.

7. The method of claim 1, wherein the operations are performed by using one or more Application Programming Interface (API) interactions.

8. The method of claim 1, wherein the trained machine-learning based model is trained on clusters created by an unsupervised machine learning system, wherein the clusters are based on received metadata including incident descriptions, resolution notes, issue tracking tickets, and code repository commit messages.

9. The method of claim 1, wherein the operations further include:
determining, using a classification model, a code change or resolution based on a received incident journey.

10. A non-transitory computer readable medium storing instructions that, when executed by one or more processors, cause the one or more processors to perform the method of claim 1.

11. A method for determining a risk level for a proposed modification to code of a software component of a system, the method comprising, performing by one or more processors, operations including:
determining a risk level for the proposed modification; the determining a risk level for the proposed modification including:
    receiving metadata regarding the proposed modification to the system;
    extracting a feature from the received metadata, the extracted feature corresponding to a feature of a trained machine-learning based model for determining the risk level for the proposed modification based on a learned association between the extracted feature and an incident occurring in the system; and
    automatically determining the risk level for the proposed modification based on the extracted feature, by using the trained machine-learning based model, wherein the trained machine-learning based model is a multi-class classification machine learning model, wherein the automatically determining the risk level for the proposed modification comprises implementing dynamic thresholds that vary by application or code repository;
determining whether the code is a critical code segment or a non-critical code segment; and
performing one or more of:
    providing a suggested action for reducing the determined risk level for the proposed modification when the code is determined to be a non-critical code segment and the determined risk level is above a non-critical code predetermined threshold, or
    blocking the proposed modification from being implemented when the code is determined to be a critical code segment and the determined risk level is above a critical code predetermined threshold.

12. The method of claim 11, wherein the operations further include:
providing an alert identifying the determined risk level for the proposed modification to the system.

13. The method of claim 11, wherein the trained machine-learning based model was trained based on a first feature extracted from metadata regarding a previous modification to the system and a second feature extracted from metadata regarding a previous incident related to the previous modification occurring in the system, based on the learned association between the extracted feature and the incident occurring in the system.

14. The method of claim 11, wherein the operations further include:
providing the determined risk level as a score from 0 to 100.

15. The method of claim 11, wherein the system includes at least one of an intake system, a development system, a release system, a deployment system, or an incident reporting system.

16. The method of claim 11, wherein the operations are performed by using one or more Application Programming Interface (API) interactions.

17. A non-transitory computer readable medium storing instructions that, when executed by one or more processors, cause the one or more processors to perform the method of claim 11.

18. A computer-implemented system for determining a risk level for a proposed modification to code of a software component of a system, the computer-implemented system comprising:
a memory to store instructions; and
a processor to execute the stored instructions to perform operations including:
    determining a risk level for the proposed modification; the determining a risk level for the proposed modification including:
        receiving metadata regarding the proposed modification to the system;
        extracting a feature from the received metadata, the extracted feature corresponding to a feature of a trained machine-learning based model for determining the risk level for the proposed modification based on a learned association between the extracted feature and an incident occurring in the system; and automatically determining the risk level for the proposed modification based on the extracted feature, by using the trained machine-learning based model, wherein the trained machine-learning based model is a multi-class classification machine learning model, wherein the automatically determining the risk level for the proposed modification comprises implementing dynamic thresholds that vary by application or code repository;

determining whether the code is a critical code segment or a non-critical code segment; and performing one or more of:

providing a suggested action for reducing the determined risk level for the proposed modification when the code is determined to be a non-critical code segment and the determined risk level is above a non-critical code predetermined threshold, or blocking the proposed modification from being implemented when the code is determined to be a critical code segment and the determined risk level is above a critical code predetermined threshold.

19. The computer-implemented system of claim 18, wherein the trained machine-learning based model was trained based on a first feature extracted from metadata regarding a previous modification to the system and a second feature extracted from metadata regarding a previous incident related to the previous modification occurring in the system, based on the learned association between the extracted feature and the incident occurring in the system.

20. The computer-implemented system of claim 18, wherein the operations further include:

providing the determined risk level as a score from 0 to 100.

* * * * *